Figure 1:
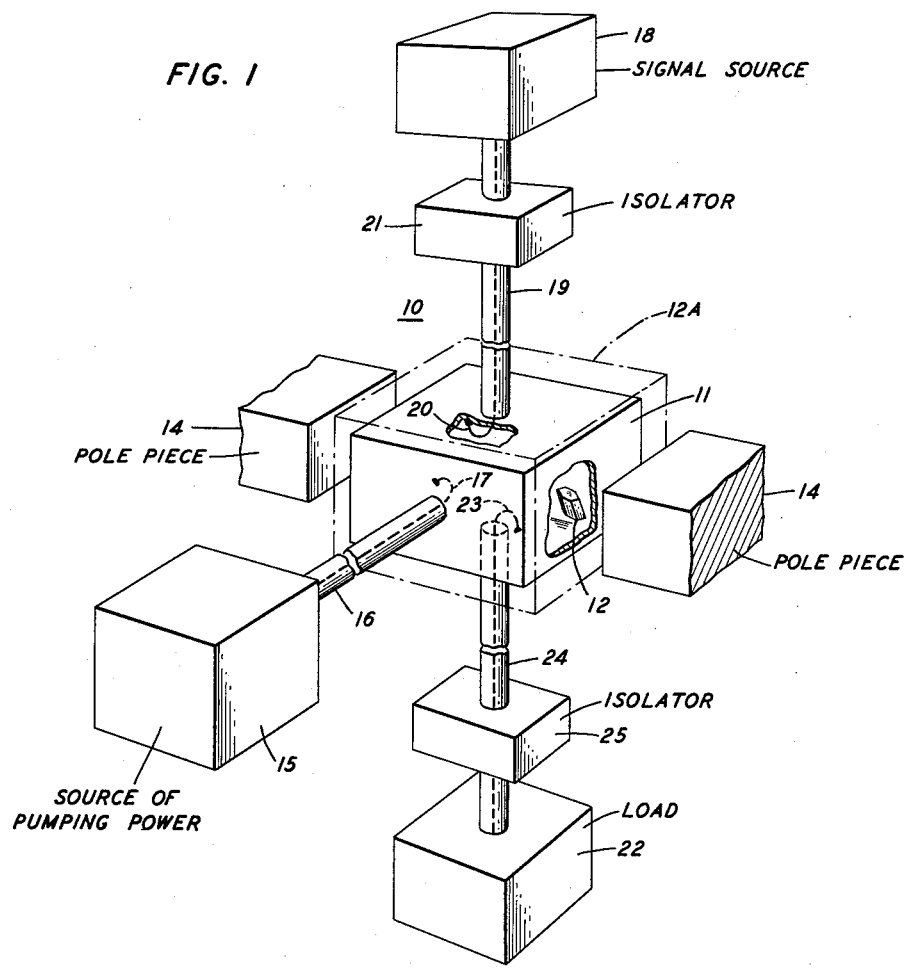

Sept. 19, 1961  W. B. MIMS  3,001,142
SOLID-STATE MASER
Filed June 24, 1959

INVENTOR
W. B. MIMS
BY
Arthur J. Torsiglieri
ATTORNEY 3,001,142
SOLID-STATE MASER
William B. Mims, New York, N.Y., assignor to Bell Telephone Laboratories, Incorporated, New York, N.Y., a corporation of New York
Filed June 24, 1959, Ser. No. 822,604
6 Claims. (Cl. 330—4)

This invention relates to a solid-state maser of the kind capable of continuous wave operation.

The general principles of solid-state masers are described in a paper entitled "The Maser" appearing in volume 1, No. 3, of the Microwave Journal, November-December, 1958, pages 18 through 25. In the usual form of solid-state maser capable of continuous wave operation there is supplied to a paramagnetic active medium whose energy system includes three levels energy of a frequency which corresponds to the separation of the highest and lowest of the three levels to equalize the population of these two levels whereby population inversion or a "negative temperature" is established between the intermediate level and one of the other two levels. Such a medium will thereafter amplify energy of a frequency corresponding to the separation of the pair of levels between which the negative temperature was established.

A characteristic of a maser of this kind is the requirement of pumping energy of a frequency higher than the signal frequency. This creates difficulties when it is desired to amplify very high frequencies since a suitable source of an appropriately higher pumping frequency may not be readily available.

One way in which this requirement has previously been avoided is the use of multiple pumping techniques characterized by the application to the active medium of pumping power of several different frequencies each lower than the signal frequency. However, this solution has the disadvantage of requiring several pumping sources.

The main object of the present invention is a solid-state maser capable of continuous wave operation which employs pumping energy essentially of a single frequency, which is lower than the signal frequency, to maintain the active medium at a negative temperature at the signal frequency.

The present invention is based on my discovery that in a paramagnetic medium which has a first pair of energy levels whose separation is a plural integral number of times the separation of a second pair of energy levels, equalization of the populations of the levels of the second pair tends to equalize the populations of the levels of the first pair when the concentration of paramagnetic ions in the active medium is sufficient high. Accordingly, by choosing as the active medium a paramagnetic crystal which has first and second pairs of energy levels having the relationship described and a third pair of energy levels whose separation is greater than the separation of the second pair, a negative temperature may be induced between such third pair of levels by applying to the active medium sufficient pumping energy of the frequency corresponding to the separation of the second pair of levels. Such a medium will then amplify applied energy of the frequency corresponding to the separation of the third pair of levels. There accordingly results a maser capable of amplifying signals of frequency higher than the frequency of the pumping energy.

An illustrative embodiment of the invention comprises a cavity resonant both at a signal frequency and a second lower pumping frequency and enclosing a crystal of aluminum oxide doped with chromium. The crystal is maintained in a magnetic field of suitable strength and orientation to establish therein four levels of which the separation between a first pair of levels is twice the separation between a second pair and the second pair has a separation smaller than the separation between a third pair. Additionally, the separation of the second pair is made to correspond to the pumping frequency and the separation of the third pair to the signal frequency. Provision is further made for applying both signal and pumping energy to the medium.

Figure 2:
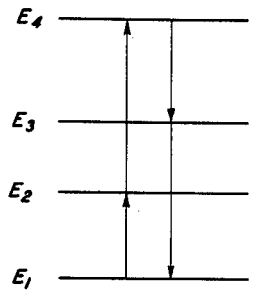
Figure 3:
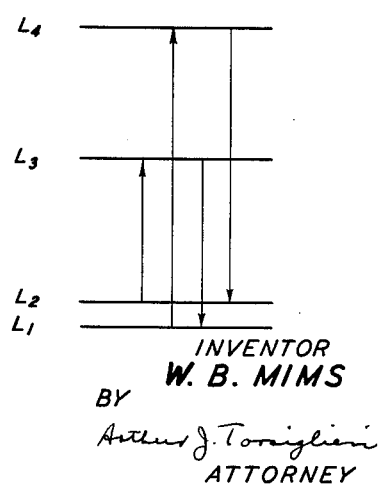

The invention will be better understood from the following more detailed description, taken in conjunction with the accompanying drawing, in which:

FIG. 1 shows an illustrative embodiment of the invention partly in block schematic form; and FIGS. 2 and 3 each show an energy level diagram which will be helpful in explaining the invention.

With reference now to the drawing, the maser 10 shown in FIG. 1 comprises a cavity 11 within which is positioned the active medium 12, a paramagnetic crystal. Advantageously, the cavity is rectangular, of a nonmagnetic material such as copper, and resonant both at the signal frequency and the lower pumping frequency with the magnetic field patterns of the two resonant modes orthogonal. The active medium illustratively is an aluminum oxide crystal including about 0.1 percent chromium. A concentration of at least 0.1 percent is found advantageous although lower concentrations, for example, .05 percent are feasible.

The cavity is immersed in a steady magnetic field provided between the pole pieces 14. The angle of the magnetic field with the principal axis of the crystal is made adjustable, since such angle is one of the two significant parameters which permits control of the separation of energy levels in the crystal. The other significant parameter is the strength of the magnetic field.

Pumping energy of the desired frequency is supplied to the cavity from the pumping source 15 by way of the transmission line 16 and the coupling loop 17 in the manner known to workers in the art for exciting the corresponding resonant mode of the cavity.

Input signal power is supplied to the cavity from the signal source 18, which typically is an antenna, by way of the transmisison line 19 and the coupling loop 20 for exciting the corresponding resonant mode of the cavity. It is advantageous to incorporate an isolator 21 intermediate between the signal source and the cavity to minimize the transfer of power from the cavity to the signal source.

Output signal power is abstracted from the cavity for utilization by the load 22 by ways of the coupling loop 23 and the transmission line 24. It is similarly advantageous to include an isolator 25 intermediate between the load and the cavity to minimize the reflection of energy from the load back into the cavity.

Alternatively, in the manner known to workers in the art, it is feasible to utilize only a single signal coupling loop to the cavity which leads to one port of a circulator, other ports of which are connected to the signal source and the load in a manner to provide transmission of input signal energy selectively from the source into the cavity and of output signal power selectively from the cavity out toward the load.

Similarly only a signal output coupling loop is necessary if the maser is used as an oscillator. In such operation, noise typically arising in the walls of the cavity serves as the input signal to stimulate the emission of radiation which gives rise to oscillations.

Typically, the cavity and advantageously in addition the isolator 25 are maintained at a low temperature, for example, that of liquid helium to minimize noise and improve efficiency. The equipment for this purpose has been omitted from the drawing in the interest of simplicity.

As previously discussed, a feature of the invention is an active medium which exhibits a prescribed energy level system.

Each of FIGS. 2 and 3 shows an energy level system of the kind suited for the active medium to be used in the practice of the invention. With respect first to FIG. 2, there are depicted energy levels $E_1$, $E_2$, $E_3$ and $E_4$, the higher the subscript the higher the energy of the level. As shown, the separation between levels $E_2$ and $E_4$ is twice the separation of levels $E_1$ and $E_2$. As is known, pumping at the frequency corresponding to the separation of levels $E_1$ and $E_2$. In accordance with my dislations of levels $E_1$ and $E_2$. In accordance with my discovery, an internal mechanism which is probably a spin-spin coupling effect further results in substantial equalization of the levels $E_2$ and $E_4$ also whereby the populations of levels $E_1$, $E_2$ and $E_4$ are all equalized.

As a consequence, there can be established a negative temperature, i.e. population inversion, alternatively, between levels $E_3$ and $E_4$ or levels $E_1$ and $E_3$. Ordinarily, however, the negative temperature occurs at the closer spaced of the two pairs of levels, in this case pair $E_3$ and $E_4$.

An energy level of the kind described was achieved by applying to the crystal described a magnetic field of 4.72 kilo-oersteds at a 60 degree angle with the crystal axis whereby the separation between levels $E_1$ and $E_2$ corresponded to 14.3 kilomegacycles, that between $E_2$ and $E_3$ to 12.0 kilomegacycles, and that between levels $E_3$ and $E_4$ to 16.6 kilomegacycles. As a consequence, by pumping at 14.3 kilomegacycles amplification is possible either at 16.6 kilomegacycles or 26.3 kilomegacycles, depending on temperature and ion concentration. At liquid helium temperature with the concentration described the negative temperature occurs at 16.6 kilomegacycles.

The energy diagram shown in FIG. 3 also includes four levels designated $L_1$, $L_2$, $L_3$ and $L_4$, the higher the subscript the higher the level. In this diagram, the separation between levels $L_1$ and $L_4$ is twice that between levels $L_2$ and $L_3$ whereby pumping at the frequency corresponding to the separation between levels $L_2$ and $L_3$ will equalize separately the populations of levels $L_2$ and $L_3$ and levels $L_1$ and $L_4$ whereby a negative temperature may be established either between levels $L_1$ and $L_3$ or between levels $L_2$ and $L_4$.

In particular, an energy diagram of this kind is achieved in the crystal described by applying a steady magnetic field of 1.76 kilo-oersteds at 90 degrees to the crystal axis and a pumping magnetic field of 9.6 kilomegacycles. As a consequence, there may be established a negative temperature either at 10.6 kilomegacycles or 18.2 kilomegacycles, although the former value is favored.

The principles of the invention have applicability in the same way to the use of an active medium in which the separation of the pair of levels being pumped indirectly is a larger integral multiple of the separation of the pair of levels being pumped directly, for example, three times. Of course, the efficiency of such indirect pumping decreases the higher the multiple.

Moreover, the desired distribution of energy levels in the active medium may be achieved by introducing more than one kind of paramagnetic ion. For example, the desired distribution may be achieved by the inclusion in an aluminum oxide crystal of both chromium and iron.

It is therefore to be understood that the principles of the invention are applicable to any active medium in which the desired separation of energy levels are realized.

Moreover, it should also be obvious that the principles of the invention are independent of the wave guiding structure employed. In particular, the principles of the invention have applicability to traveling wave masers where the signal wave is propagated along a distributed slow wave circuit and the active medium is positioned along the wave circuit either as a continuous crystal or as a series of spaced crystals.

What is claimed is:

1. A solid-state maser comprising means forming a steady magnetic field, a paramagnetic crystal positioned in the magnetic field such that the crystal includes a first pair of energy levels whose separation is an integral multiple of the separation of a second pair of levels and a third pair whose separation is greater than that of said second pair, means for applying to the crystal pumping energy only of the frequency corresponding to the separation of the second pair of levels for creating a negative temperature at the frequency corresponding to the separation of the third pair of levels, and means for abstracting for utilization output energy of the frequency corresponding to the separation of the third pair of levels.

2. A solid-state maser in accordance with claim 1 in which the paramagnetic crystal is of aluminum oxide doped with at least 0.1 percent chromium.

3. A solid-state maser comprising a cavity resonant at a pump frequency and a higher signal frequency, and a paramagnetic crystal enclosed within said cavity whose energy level system includes a first pair of levels separated by a first amount that corresponds to the pump frequency, a second pair separated by an amount that is a plural integral number of times said first amount, and a third pair of levels spaced apart by an amount that corresponds to the signal frequency, the signal frequency being higher than said pump frequency, means for applying energy of said pump frequency to the cavity for establishing therein a negative temperature between the third pair of levels, and means for applying signal energy to the cavity for amplification and for abstracting the amplified signal, the maser being free of other pumping energy.

4. A maser according to claim 1 in which the second pair of levels has a separation twice the separation of the first pair.

5. A solid-state maser comprising conductive means defining an interaction space, a paramagnetic crystal positioned in the interaction space and characterized in that it includes a first pair of levels whose separation is twice the separation of a second pair and a third pair whose separation is greater than the separation of the second pair, means for establishing a negative temperature with respect to said third pair including means for applying to said crystal energy of the frequency corresponding to the separation of said second pair, and means for applying for amplification and for abstracting for utilization energy of a frequency corresponding to said third pair, the maser being free of other pumping energy.

6. The solid-state maser in accordance with claim 5 including means for providing a steady magnetic field in the crystal for producing the desired spacing of energy levels.

References Cited in the file of this patent

Chang et al.: "Proceedings of the IRE," July 1958, pages 1383–1386.